United States Patent
Shook (10) Patent No.: US 6,519,893 B2
(45) Date of Patent: Feb. 18, 2003

(54) MOVEMENT SIGNALING DEVICE

(75) Inventor: Frederic Shook, Aurora, IL (US)

(73) Assignee: Frederic W. Shook, Aurora, IL (US)

( * ) Notice: Subject to any disclaimer, the term of this patent is extended or adjusted under 35 U.S.C. 154(b) by 70 days.

(21) Appl. No.: 09/767,520

(22) Filed: Jan. 23, 2001

(65) Prior Publication Data

US 2002/0095849 A1 Jul. 25, 2002

(51) Int. Cl.[7] .............................................. A01K 85/01
(52) U.S. Cl. ............................................................. 43/17
(58) Field of Search .......................... 43/4, 16, 17, 15, 43/43.1, 43.11, 58

(56) References Cited

U.S. PATENT DOCUMENTS

| | | | | |
|---|---|---|---|---|
| 2,693,046 A | * | 11/1954 | Langevin | 43/17 |
| 2,955,374 A | * | 10/1960 | Matzo et al. | 43/16 |
| 2,999,328 A | * | 9/1961 | Revord | 43/17 |
| 3,645,029 A | * | 2/1972 | Roemer | 43/17 |
| 4,565,024 A | * | 1/1986 | Maerz | 43/17 |
| 4,566,216 A | * | 1/1986 | Randall | 43/17 |
| 4,821,446 A | * | 4/1989 | Beaulieu, Jr. | 43/17 |
| 4,942,687 A | * | 7/1990 | Post | 43/17 |
| 5,224,284 A | * | 7/1993 | Kelsey et al. | 43/17 |
| 6,105,300 A | | 8/2000 | Abdo | |
| D432,620 S | | 10/2000 | Rozkowski | |
| 6,125,573 A | | 10/2000 | Wilczynski | |

* cited by examiner

Primary Examiner—Charles T. Jordan
Assistant Examiner—Susan L Piascik
(74) Attorney, Agent, or Firm—Sonnenschein, Nath & Rosenthal (57) ABSTRACT

An ice fishing jig with a signal indicator. Signaling a fish bite is enhanced by submerging a guide within a hole bored in an ice surface. An indicator is disposed at least partially within the passage of the guide. Further, a body is movably attached to the guide to occlude and seal a guide aperture in the lower portion of the guide. The body is movably attached to the second end of the guide to submerge the body under the water. A fish line is attached to the body to move the body relative to the guide upon an amount of movement of the fish line. The movement of the body unseals the guide aperture to allow the water to flow into the guide to raise the indicator causing the indicator to protrude above the first end of the guide.

20 Claims, 6 Drawing Sheets

MOVEMENT SIGNALING DEVICE

BACKGROUND OF THE INVENTION

The present invention relates to a device to signal movement. In particular, the invention relates to methods and other accommodations for signaling movement from a caught animal, particularly a fish.

While ice fishing is a popular sport throughout the world, it may be an extremely cold and windy sport. As such, early detection and signal of a fish bite is extremely important. Anglers commonly fish a multitude of holes at the same time in order to better increase the chance of catching a fish. Accordingly, anglers position a fishing pole or jig at each ice hole and watch each for a fish bite. Commonly, the angler will retreat to a small housing to escape the cold and windy environment and will watch the poles from the housing.

A problem with watching the ice holes from afar, however, is being able to accurately detect when a fish is biting. A need, therefore, exists to alert the angler of the fish bite. The solution, however, must be capable of alerting the angler in a windy environment without giving a false signal. Further, a need exists to alert the angler from a distance. Further, a need exists to easily and efficiently carry and support an ice-fishing signaling device.

Ice fishing jigs currently available often utilize a flag to signal when a fish is hooked. In these jigs, a spring and clip mechanism holds a flag down where the clip connects to the fish line. Upon a bite, the line pulls the clip from the spring, which in turn releases the flag to signal the bite. These jigs however fail to meet the current need. As ice fishing is performed outdoors, heavy winds often trip the spring and clip mechanism to raise the flag. Accordingly, a false signal is given by the current jigs requiring the angler to not only inspect the fishing line but also to reset the flag. Because multiple fishing holes may be used, these false signals tripped by the wind require the angler to spend more time checking the fish lines. Additionally, a "nibble" on the fish line may provide enough force to trip the flag resulting in a false signal.

U.S. Pat. No. 6,105,300 issued to Abdo also discloses an ice fishing jig. In the '300 patent, a shaft with a reel attached extends through a housing. A flag assembly located on the outside of the housing attaches to the shaft. Thus, when a fish bites, the shaft trips the flag assembly to raise the flag. This jig, though, does not solve the current need as wind may also trip the flag assembly to give a false signal. Accordingly, an angler is required to leave the housing and to reset the flag assembly. Further, the housing is bulky resulting in an inefficient and cumbersome way of carrying the jig.

Another device, U.S. Pat. No. 6,125,573, issued to Wilczynski discloses an ultra-sensitive fish bite indicator. In the '573 patent, a spring and wire attach to the distal end of a fishing rod on a mount. The mount in turns loops to connect to the fish line. When a fish bites on the fish line, the tension in the line pulls the mount towards the fishing rod, causing the wire to flex off the spring, to signal that a fish is biting. This bite indicator, also, contains deficiencies for the current need. Although the bite indicator gives a signal of a fish bite, the bite indicator is not adapted for ice fishing. For example, the flex of the wire toward the rod will not give sufficient notice to an angler located at a distance from the rod that a fish is biting. Further, heavy winds also cause the wire to flex up and down resulting in a false signal requiring the angler to leave the housing and to check the fish lines.

U.S. Design Patent No. 432,620, issued to Rozkowski, discloses a ice fishing jigging rig with ornamental features relating to stands that adhere to the ice. The design further discloses a spring assembly connected between the reel and fish line, which flexes upon a bite. This jig, too, contains deficiencies, as the jig is not designed to prevent the wind from giving a false signal. Additionally, the design discloses a bulky jig resulting in a cumbersome way of carrying the jig.

SUMMARY OF THE INVENTION

The present invention relates to a signal device, in particular, an ice fishing jig to be used in conjunction with a hole cut into a frozen surface of a body of water to expose liquid water within the hole. In an embodiment, a guide which has a first end, a second end and a passage is sized to be received in the hole where the guide is submerged in the hole.

An indicator is disposed at least partially within the passage of the guide. Further, a body is movably attached to the guide to occlude and seal a guide aperture in the lower portion of the guide.

In an embodiment, the body is rotatably attached to the second end of the guide to submerge the body under the water. A bias is positioned to releaseably seal the body to the guide where the bias is configured to tension the body against the guide.

A fish line is rotatably attached to the body to move the body relative to the guide upon an amount of movement of the fish line. The movement of the body unseals the guide aperture to allow the water to flow into the guide to raise the indicator causing the indicator to protrude above the first end of the guide.

In an embodiment, the water directly engages the indicator. Accordingly, the indicator is floatable in the water. Further, in an embodiment, an arrangement prevents the indicator from freezing to the guide.

In an embodiment, a support assembly is engaged with the guide to hold the guide in a partially submerged position in the hole wherein the support assembly has a handle end, a restraining end and a support rod distally positioned in-between. The support assembly is pivotally attached to the guide. Accordingly, the support rod is movable between a carry position and a support position where the restraining end engages the guide in the carry position.

In an embodiment, the guide is sized to fit in the hole where the guide has a first open end, a second closed end having a plurality of guide apertures extending therethrough. In an embodiment, each guide aperture is equilaterally spaced on the second closed end which is positioned below the water while first open end is held above the water.

The body is rotatably attached beneath the guide at the second closed end to occlude the plurality of guide apertures. In an embodiment, the body has at least one body aperture therethrough alignable with the plurality of guide apertures in the second closed end when the body is rotated to a predetermined position.

A fish line is attached to the body to rotate the body relative to the guide, where the movement of the body aligns the plurality of guide apertures with the at least one body aperture, to allow water to flow into the guide to float the indicator causing the indicator to rise in the guide and protrude from the first open end of the guide.

An advantage of the present invention is to provide an indicator to signal when a movement such as a fish bite occurs.

Another advantage of the present invention is to signal a movement to an observer located at a distance.

Another advantage of the present invention is to is to prevent environmental conditions from giving a false signal of a movement.

Another advantage of the present invention is to provide an easy, economical and efficient way to transport and to support the indicator.

Still further advantages will become apparent from a consideration of the following descriptions and drawings.

DETAILED DESCRIPTION OF THE PREFERRED EMBODIMENTS

Figure 1:
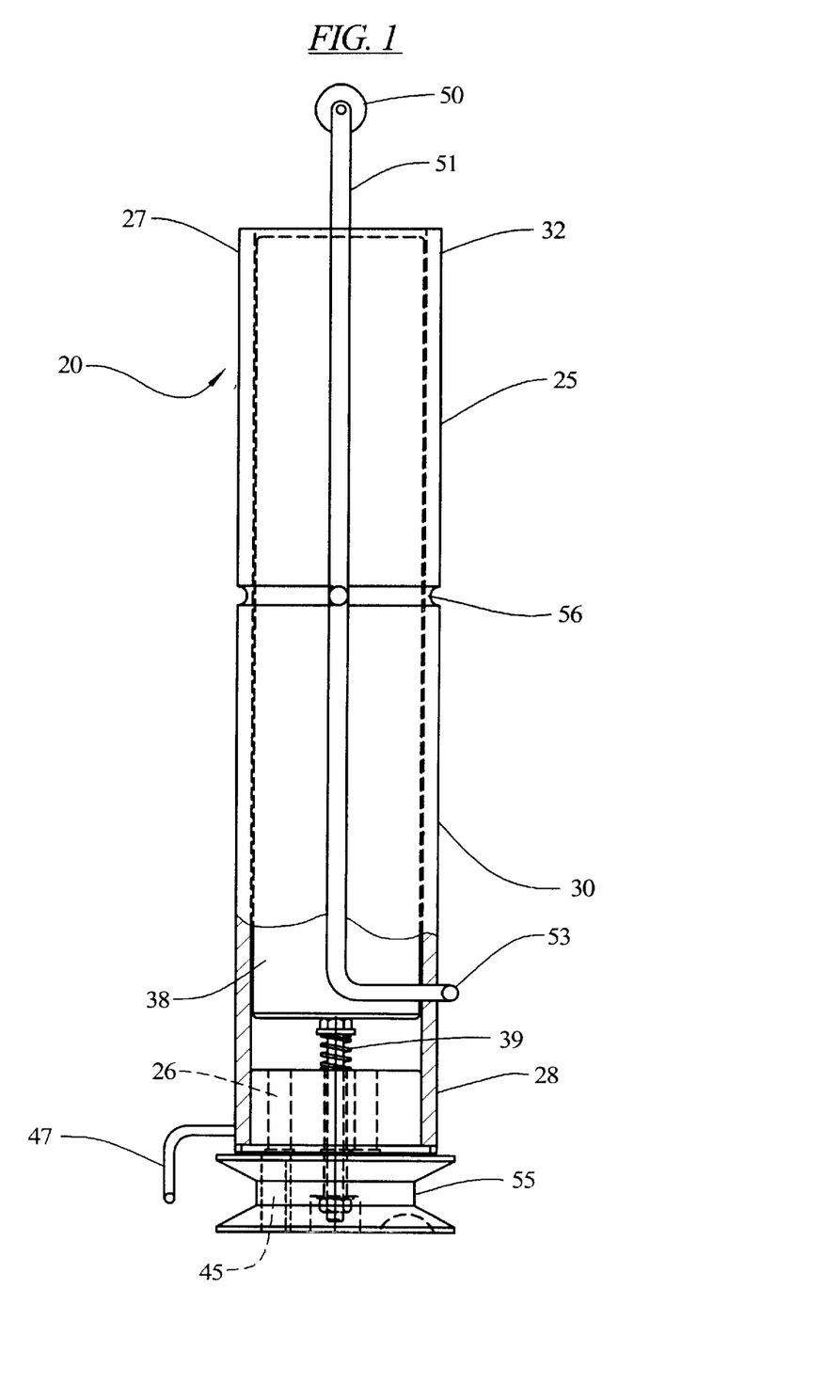
FIG. 1 is a side cross sectional view of an ice fishing jig embodying the principles of the present invention.
Figure 2:
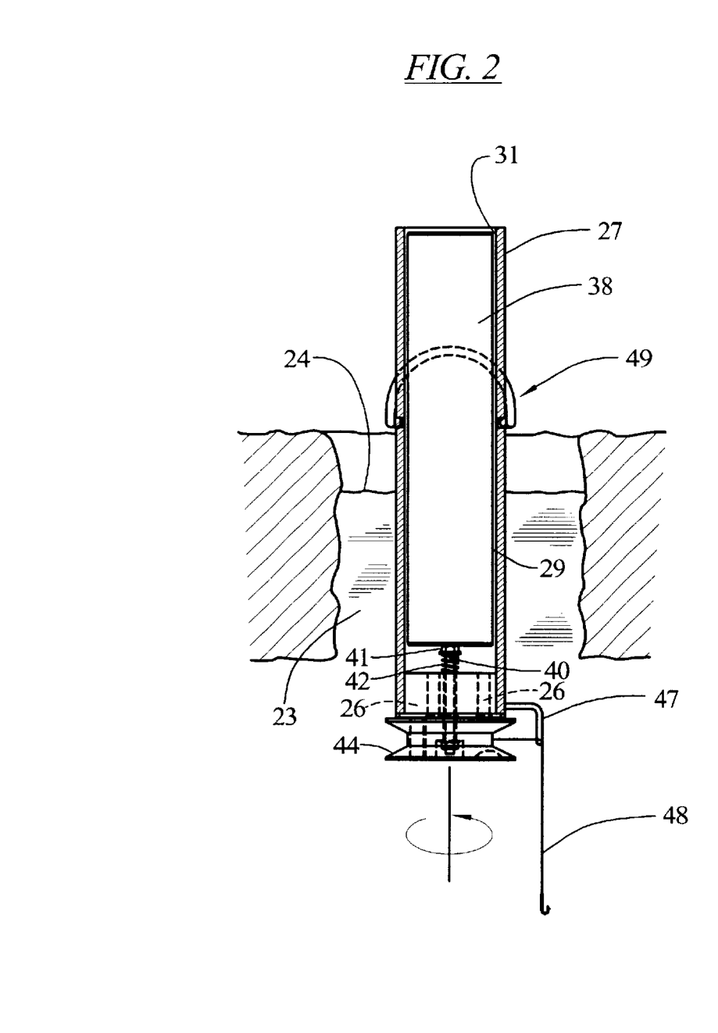
FIG. 2 is a side cross sectional view of the ice fishing jig of FIG. 1 in a non-signaling condition.
Figure 3:
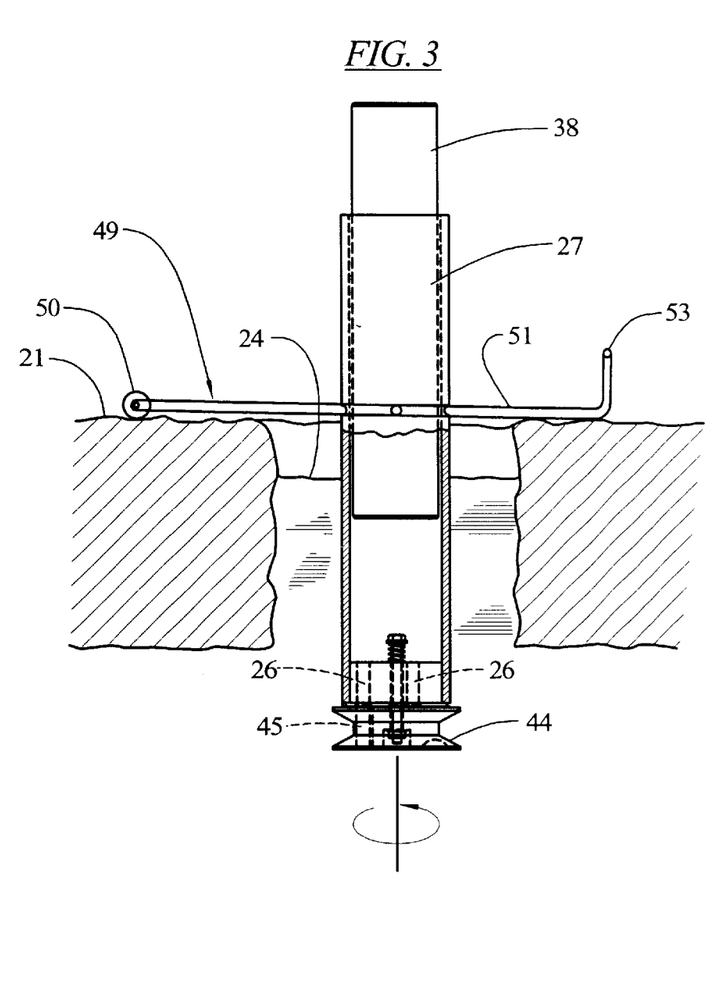
FIG. 3 is a side cross sectional view of the ice fishing jig of FIG. 1, rotated 90° from FIG. 2, and in a signaling condition.

FIG. 1 shows in cross section a preferred embodiment of an ice fishing jig 20 to signal movement. In the preferred embodiment, the ice fishing jig 20 signals movement created by an animal, particularly a fish. In ice fishing, anglers bore a hole 22 (FIG. 5) through the ice surface 21 where water 23 fills the hole 22 up to a water line 24 as shown in FIGS. 2 and 3. In the present invention, the ice fishing jig 20 is partially inserted through this hole 22 and partially submerged below the water line 24.

The preferred embodiment of the present invention comprises an indicator 38 to alert the observer of the movement. In the preferred embodiment, the indicator 38 is made of a lightweight water insoluble material such as polystyrene. It should be noted, however, that other materials having a density less than water may also be used, such as hollow, sealed tubes of extruded plastic, lightweight metal, wood, molded plastic, or other materials. Additionally, the indicator 38 may be colored, preferably a noticeable color such as a fluorescent color, to better alert the observer. In the preferred embodiment, the indicator 38 comprises a round cylindrical shape in order to reduce wind resistance and for cost reduction and availability considerations. Preferably, the indicator 38 has an outer diameter less than 1.5 inches and a height of 9.5 inches. However, it should be noted that the indicator 38 may comprise other shapes, including triangular or flat.

As shown in FIGS. 1–3 and 5, a guide 25, having a first end 27 and a second end 28 encloses the indicator 38 within a passage 29 formed by walls 32 in the guide 25. In the preferred embodiment, the guide 25 is longer than the indicator 38 in order to completely enclose the indicator 38 within the passage 29. Also, preferably the guide 25 is a round hollow cylinder, such as an extruded PVC tube, however, other shapes and materials may be used within the scope of the invention. Further, the guide 25 preferably has an outer diameter of approximately two inches and a height of 11 inches. Because the guide 25 is slideably disposed about indicator 38, the indicator 38 is not fixed to the passage 29 leaving a space 31 between the indicator 38 and the walls 32.

As the ice fishing jig 20 is disposed outdoors, ice may form between the indicator 38 and the passage 29 if water is present in the passage 29. To prevent ice from forming in the space 31, an arrangement 36 is provided which prevents the indicator 38 from freezing to the guide 25 or at least minimizes any ice formation that may occur.

Figure 5:
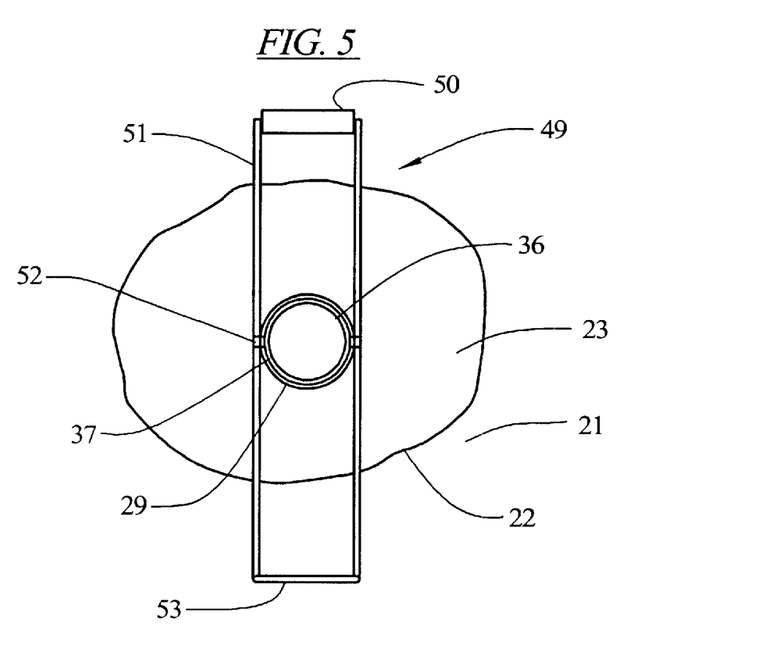
FIG. 5 is a plan view of the ice fishing jig as in FIGS. 2 or 3.

In an embodiment, the arrangement 36 includes a plurality of standoffs 37 positioned between the indicator 38 and the guide 25 as shown in FIG. 5. The standoffs 37 are thin column members or pins which are connected to either the indicator 38 or the walls 32 of the guide 25 to position the indicator 38 away from the guide 25. As the contact surface between the standoffs 37 and either the indicator 38 or guide walls 32 is small, the amount of ice which might possibly form would be insufficient to prohibit movement of the indicator 38 as discussed below. In another embodiment a coating, e.g., Teflon™, is applied to the walls 32 to prevent water from sticking to the walls 32, and hence, preventing ice forming between the indicator 38 and the guide 25. Also, the indicator 38 may be shaped relative to the walls 32 of the passage 29 to minimize the possible surface area contact between the two. For example, the indicator 38 may have a triangular cross-section and the passage 29 may have a circular cross-section. If the indicator 38 is smaller than the passage 29, then the areas of contact would be limited to at most two corners of the indicator 38.

If the vertical corner edge is configured other than straight, the contact area would be further minimized.

Figure 6:
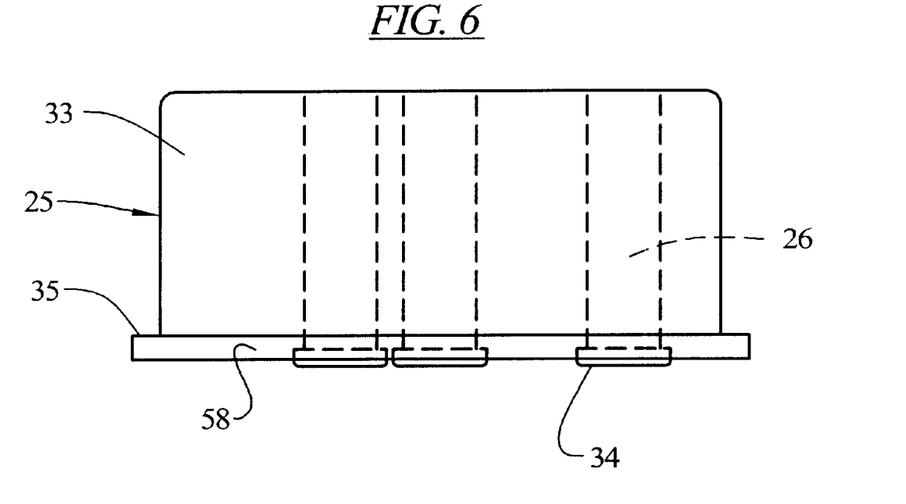
FIG. 6 is a side elevational view of a bottom end of the guide of FIG. 1.
Figure 7:
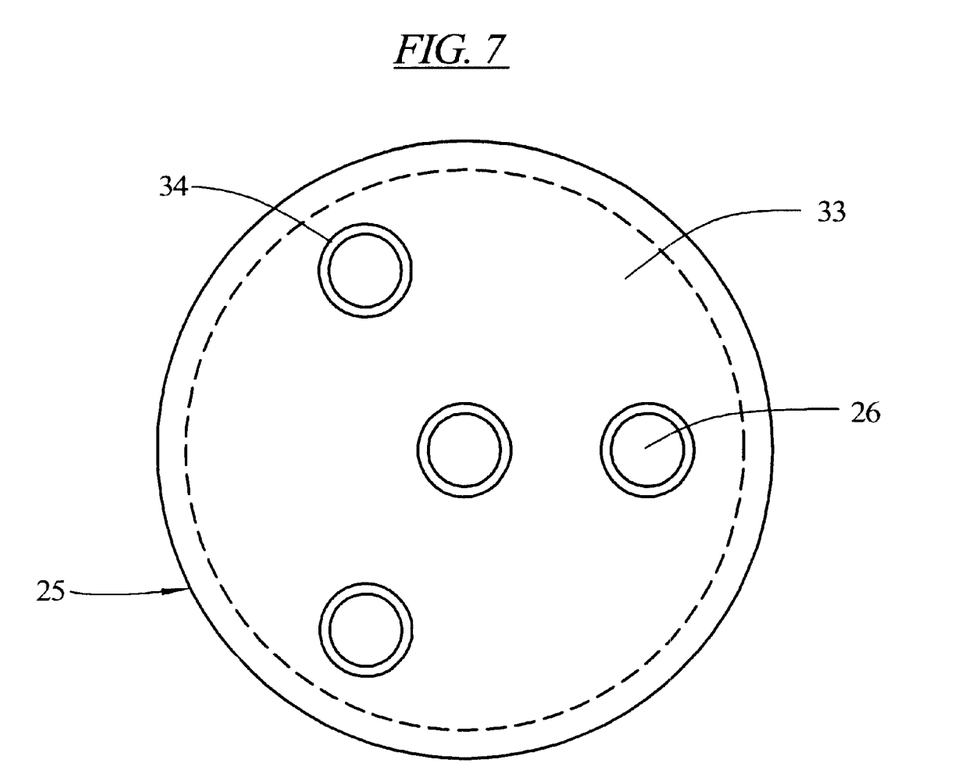
FIG. 7 is an end elevational view of the guide of FIG. 6.

As shown in FIG. 6, a lower end of the guide 25 has a plurality of guide apertures 26 extending through an otherwise closed end 58 of the guide 25 where the guide apertures 26 are spaced equilaterally from each other. These guide apertures 26 may be formed in a separate member such as a plug 33 sealed to the second end 28 of the guide 25, or the second end 28 of the guide 25 may have a closed end with the guide apertures 26 formed therein. Excellent results are obtained when the guide 25 has three guide apertures 26 spaced at 120 degree intervals as shown in FIGS. 6 and 7. Other embodiments, however, can have a single guide aperture 26, two guide apertures 26 or more than three guide apertures 26. Each of the guide apertures 26 may be round, oval, arcuate or of other shapes. Each of the guide apertures 26 is preferably lined with an o-ring 34 which protrudes above a surrounding surface to seal against fluids as described below. In the preferred embodiment, the guide aperture 26 is positioned on the second end 28 as shown in FIG. 6. Alternatively, the guide aperture 26 may be positioned in a lower portion 30 of the guide 25, including through the wall 32. If a separate plug 33 is utilized for providing the guide apertures 26, in a preferred arrangement, the plug 33 has an outer surface shaped complementarily to the walls 32 of the passage 29 to provide a liquid tight seal therebetween. Also, a shoulder 35 may be provided at an end of the plug 33 to provide a stop and to prevent the plug 33 from being inserted too far into the guide 25.

Figure 8:
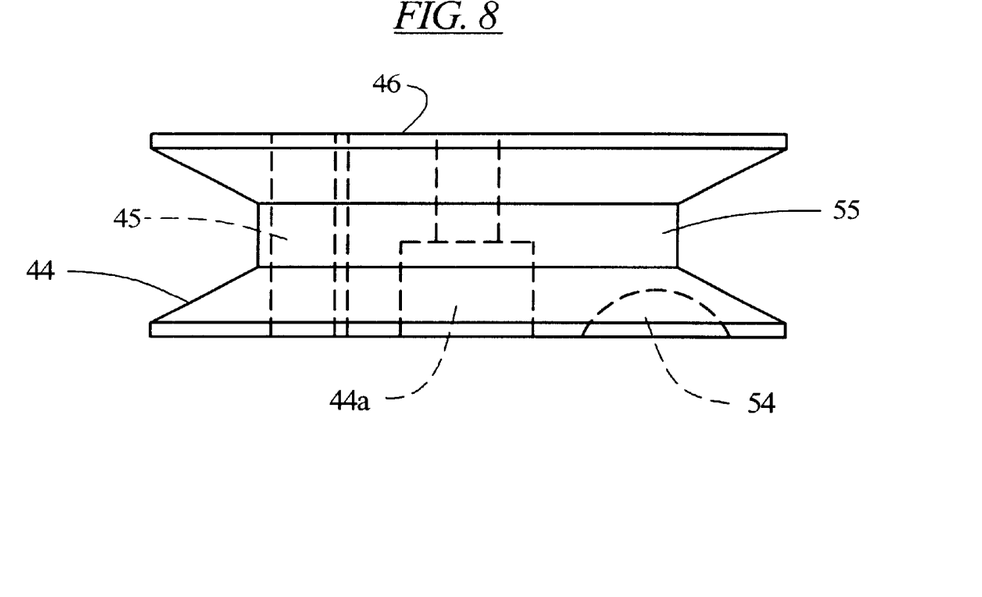
FIG. 8 is a side elevational view of the body of FIG. 1.
Figure 9:
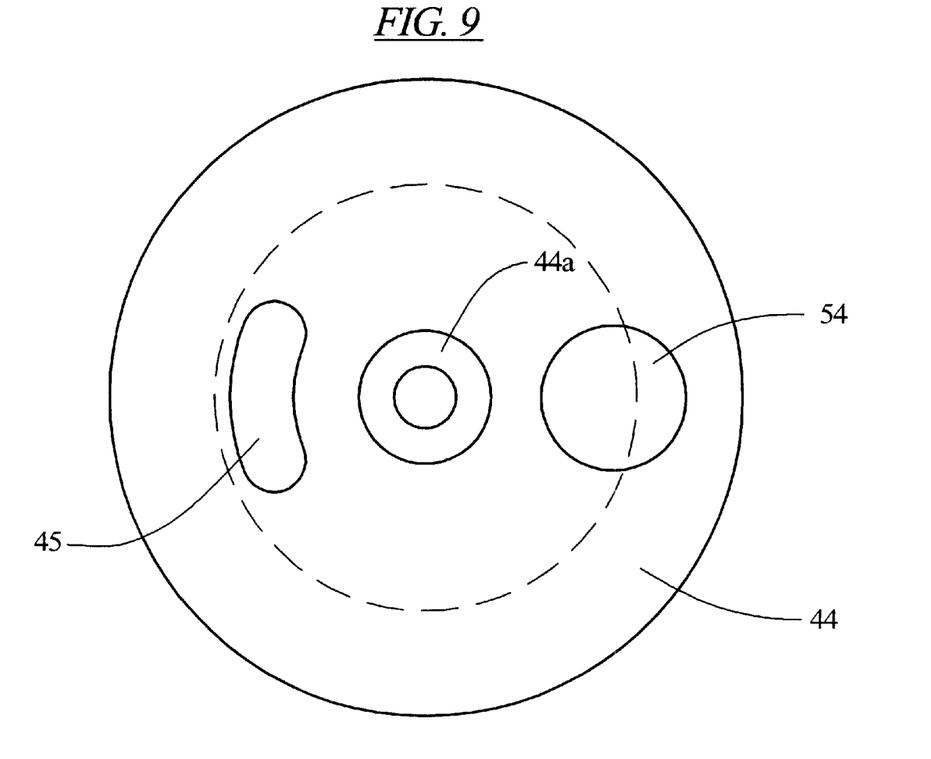
FIG. 9 is an end elevational view of the body of FIG. 8.

As shown in FIGS. 1, 2 and 3, a body 44 is movably, and preferably rotatably attached to the guide 25 to selectively occlude and seal the guide aperture 26. The body 44 has at least one body aperture 45 therethrough as shown in FIG. 8. In the preferred embodiment, the body aperture 45 is elongated as shown in FIG. 9 or may be an arcuate, circular or rectangular aperture. In an alternative embodiment, the body 44 may have a plurality of body apertures 45. In the preferred embodiment, the second end 28 is coupled to a sealing body end 46 of the body 44 where the body 44 is positioned under the guide 25 as shown in FIG. 2. In this embodiment, the body 44 and the guide 25 share a common axis. The body 44 may be, however, positioned on a lower portion 30 of the guide 25 in an alternative position, such as against the outer side wall of the guide 25.

In one embodiment, the body 44 is a reel. However, it should be noted that the body 44 can also include those means known in the art for holding fish line and can further include, but is not limited to, spools and cylinders. The body 44 includes a circumferential groove 55 to spool a fish line 48 as shown in FIGS. 2 and 8. A line guide 47 connects to the guide 25 to properly align the fish line 48 coming out of the circumferential groove 55. In the preferred embodiment, the body 44 further includes a recess 54 as shown in FIGS. 8 and 9. The recess 54 is configured to a finger where the angler can insert a finger and rotate the body 44 to spool the fish line 48 as commonly known in the art. In the preferred embodiment, the recess 54 is machined into the body 44. In other embodiments, however, the recess 54 is separately mounted to the body 44 to provide a rotating or stationary knob affixed to the body 44 for the purpose of spooling the fish line 48.

The fish line 48 is fixedly attached to the body 44 which moves the body 44 when acted upon by a movement such as a fish bite. The body 44 is positioned against the guide 25 to rotate upon a movement of the fish line 48, rotating the body aperture 45 to align with the guide apertures 26. The body aperture 45 and guide apertures 26 alternately align as the body aperture 45 is rotating with the body 44 and relative to the guide 25.

Figure 4A:
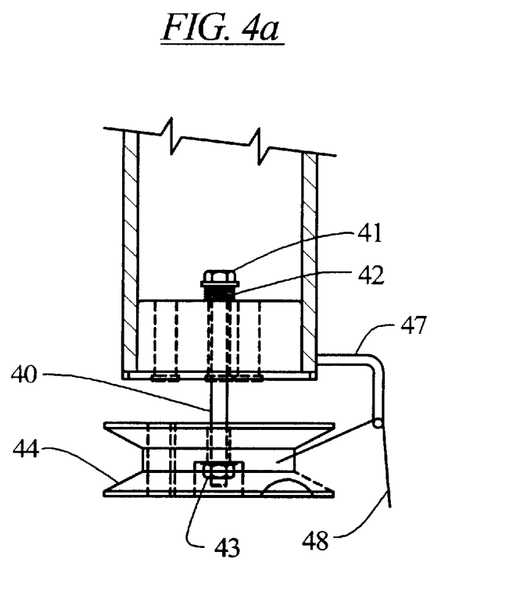
FIG. 4a is a partial side sectional view of the ice fishing jig of FIG. 1 in a water removal position.
Figure 4B:
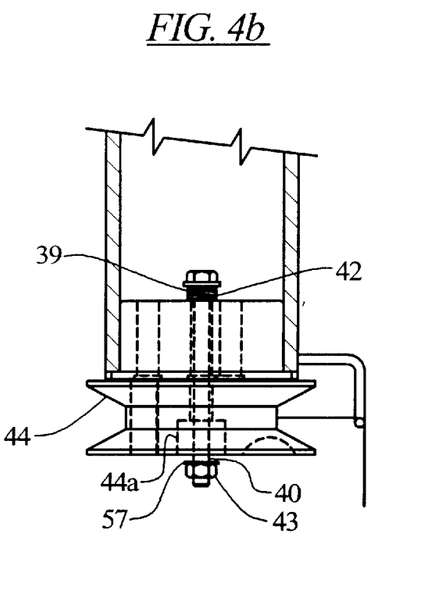
FIG. 4b is a partial side sectional view of FIG. 4a in a tension adjusting condition.

In order to couple the guide 25 to the body 44, a biasing member generally shown as 39 in FIGS. 1 and 4b presses the guide 25 to the body 44, in an embodiment, the biasing member 39 includes a bolt 40 having a head 41 and a spring 42 captured thereon where the bolt 40 is disposed through the body 44 and the guide 25 and is engaged by a nut 43 with a nut o-ring and ¼" washer 57 attached. The spring 42, in turn, is disposed between the head 41 and the second end 28 of the guide 25. Preferably, the bolt 40 comprises a ¼-20×2" OAL galvanized hex head screw, the spring 42 comprise a 0.375" O.D.×0.035" WD×1.00" OAL spring while the nut 43 comprises a ¼-20 nyloc nut. It should be noted, however, that the biasing member 39 can also include those means known in the art and can further include, but is not limited to, the bolt 40 alone, compression members and tensioning devices. The biasing member 39 is configured to seal the body 44 to the guide 25 by pressing the protruding o-ring 34 of the second end 28 of the guide 25 to the sealing body end 46 of the body 44. Thus, when the body aperture 45 in the body 44 is aligned with the guide aperture 26 in the guide 25, an open conduit will extend from an exterior side of the body into the passage 29. When the body aperture 45 in the body 44 is out of alignment with the guide aperture 26, the passage 29 will be sealed from the exterior. Further, the biasing member 39 regulates tension of the fish line 48. In the preferred embodiment, the bolt 40 and nut 43 may be adjusted to tighten and to loosen the body 44. As shown in FIG. 4b, the bolt 40 can be pressed against the spring 42 to expose the nut 43, which is normally held in a recess 44a in the body 44. As the nut 43 is tightened on the bolt 40, the biasing force provided by the spring 42 will be increased, thus holding the body 44 tighter against the guide 25. In such a condition, greater force on the fish line 48 will be required to rotate the body 44. As the nut 43 is loosened, the body 44 will rotate more freely. Therefore, the biasing member 39 can regulate the amount of tension with which the body 44 is sealed against the guide 25. Accordingly, different amounts of force may be required to rotate the body 44. Hence, the sensitivity of each embodiment can be adjusted for signaling fish of various sizes and weights.

Figures 10, 11, 12:
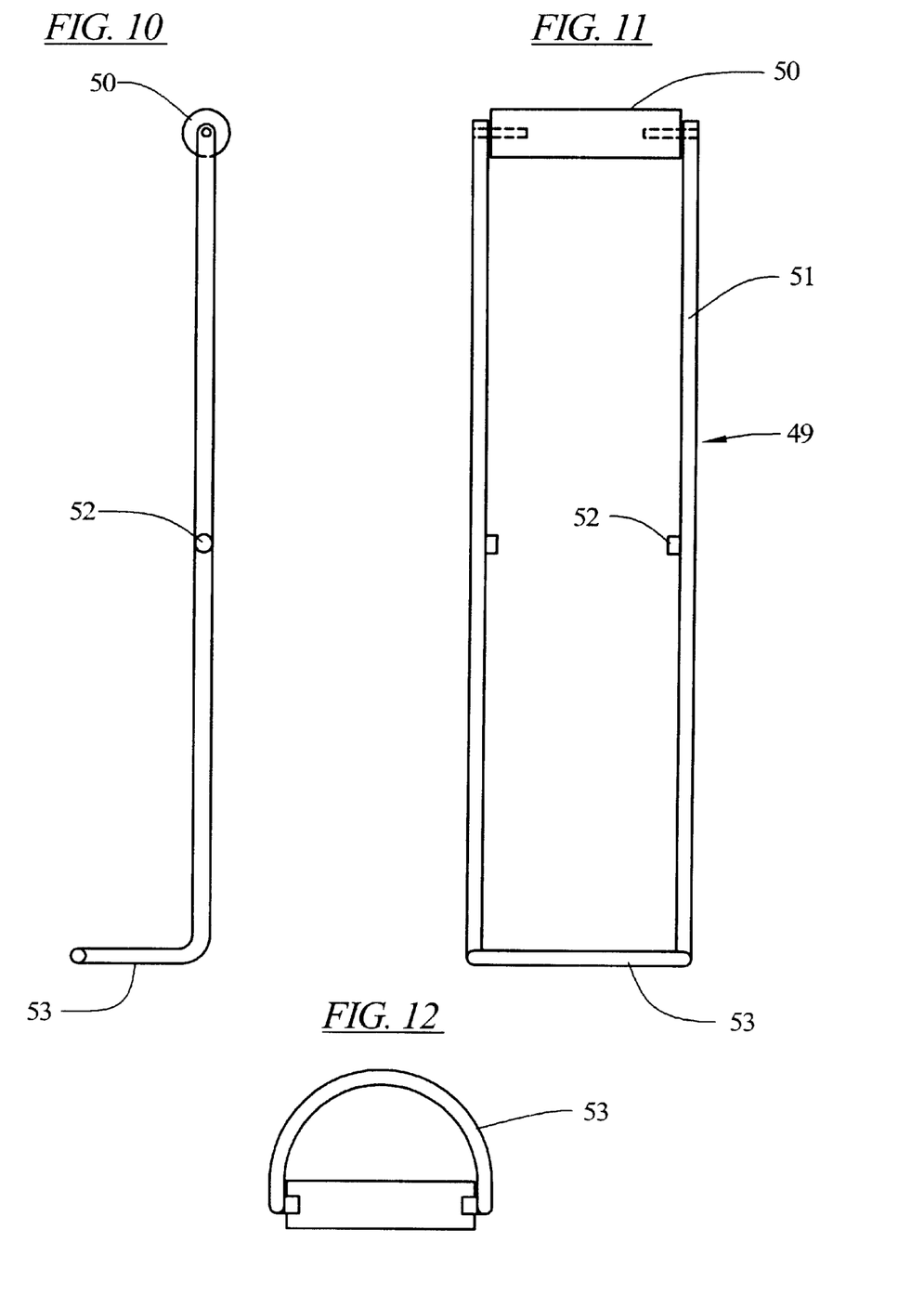
FIG. 10 is a side elevational view of the support assembly of FIG. 1.
FIG. 11 is a side elevational view of the support assembly of FIG. 10, rotated 90°.
FIG. 12 is an end view of the support assembly of FIGS. 10 and 11.

In order to efficiently and conveniently transport and support the present invention, a support assembly 49 attaches to the guide 25 as shown in FIG. 1. The support assembly 49 includes a handle end 50, a restraining end 53, pivot pins 52 and a support rod 51 as shown individually in FIGS. 10, 11 and 12. The support assembly 49 is configured to transport the ice fishing jig 20. In the preferred embodiment, the support rod 51 rotatably connects to the guide 25 via the pivot pins 52 engaging in holes in the wall 32 of the guide 25. The support rod 51 is adapted to rotate ninety degrees from a carry position to a support position as shown in FIGS. 1 and 2. In the carry position, the handle end 50 is positioned above the guide 25 to allow the angler to grasp the handle end 50 and easily carry the ice fishing jig 20. In this carry position, the restraining end 53, which is configured as a generally U-shaped structure, partially surrounds the guide 25 to conform with the guide 25.

Also, the support assembly 49 is configured to support the ice fishing jig 20. When the ice fishing jig 20 is to be placed over the hole 22, the support rod 51 is rotated ninety degrees to the support position. The support assembly 49 engages the guide 25 to hold the guide 25 in a partially submerged position in the hole 22 as shown in FIG. 2. In the support position, the support rod 51 locks into place by engaging into a horizontal recess 56 machined into the guide 25. In the preferred embodiment, the support rod 51 is provided on both sides of the guide 25 as shown in FIG. 5. In an alternative embodiment, the support rod 51 is provided on only one side of the guide 25.

As shown in FIGS. 2 and 3, the guide 25 is sized to be placed in the hole 22 where substantially most of the guide 25 is submerged under the water line 24. Accordingly, the second end 28 and the lower portion 30 are submerged under the water line 24. As positioned, the first end 27 is positioned over the hole 22 above the ice surface 21. In this position, the body 44 is also positioned below the water line 24, so that all of the moving parts will remain in liquid water and no freezing will occur at these parts.

Before the guide 25 is inserted into the water 23, the body 44 is rotated relative to the guide 25 such that the guide apertures 26 and body apertures 45 are out of alignment. The indicator 38 is inserted into the passage 29.

When a fish engages the fish line 48 and pulls on it, the body 44 will rotate and will cause alignment to occur between the guide apertures 26 and the body apertures 45, at least once during each rotation of the body 44 relative to the guide 25.

During the alignment, water flows through the body aperture 45 and the guide apertures 26 into the passage 29 within the guide 25. As the guide 25 is partially displaced under the water line 24, the water flows into the guide 25 to displace the indicator 38 from a first position to a second position at least partially outside the guide 25 as shown in FIG. 3. The second position protrudes the indicator 38 out of the first end 27 of the guide 25 to signal the observer. In the preferred embodiment, the indicator 38 is directly engaged by the water flowing into the guide 25. Thus, the indicator 38 is floatable in water. In an alternative embodiment, the indicator 38 may not be directly engaged by the water while still being activated by the water. For example, there may be an intermediary element positioned between the water and the indicator 38 which is forced upwardly by the rising water in the passage 29. In such an arrangement, the indicator 38 itself may not be floatable, but the intermediary element would be.

After the fish has been brought in and the jig 20 is ready to be reset, the water 23 in the passage 29 is removed by pouring it out the top end and/or by moving the body 44 against the bias of the spring 42 to unseal the guide apertures 26 as shown in FIG. 4a. In this condition, air could also be blown into the passage 29 to force out any remaining water 23.

Although the body 44 is illustrated as having a size and shape to cover the second end 28 of the guide 25, the body 44 could be configured and shaped differently such that the guide apertures 26 become exposed upon rotation of the body 44, even without body apertures 45 through the body 44. For example, the body 44 may have external indents in its peripheral edge which expose the guide apertures 26 when the body 44 is rotated. Alternatively, the body 44 may have a rectangular or other shaped portion which engages the end of the guide 25 and which overlies the guide apertures 26 in one orientation and exposes the guide apertures 26 in another rotational orientation. Further, the mating surfaces between the body 44 and the guide 25 may be angled or shaped such that the guide apertures 26 are sealed in one orientation and exposed in another, or the body 44 may be mounted to the guide 25 such that it moves away and exposes the guide apertures 26 when the fish line 48 is pulled.

Although the foregoing detailed description of the present invention has been described by reference to various embodiments, and the best mode contemplated for carrying out the prevention invention has been herein shown and described, it will be understood that modifications or variations in the structure and arrangement of these embodiments other than there specifically set forth herein may be achieved by those skilled in the art and that such modifications are to be considered as being within the overall scope of the present invention.

I claim:

1. An ice fishing jig to be used in conjunction with a hole cut into a frozen surface of a body of water to expose liquid water within the hole, comprising:
    a guide sized to be received in the hole and having a first end, a second end and a passage therein, the guide positioned in the hole to submerge a lower portion of the guide within the liquid water;
    an indicator at least partially received in the passage of the guide;
    a body movably attached to the lower portion to occlude a guide aperture in the lower portion of the guide;
    an arrangement to prevent the indicator from freezing to the guide comprising at least one of a plurality of standoffs between the indicator and the guide and a coating on at least one of the indicator and the guide to prevent an accumulation of ice between the indicator and the guide;
    a biasing member positioned to releaseably seal the body to the guide at the aperture; and
    a fish line attached to the body to move the body relative to the guide upon a movement of the fish line, the movement of the body unsealing the guide aperture to allow the water to flow into the guide to raise the indicator causing the indicator to protrude above the first end of the guide.

2. The ice fishing jig of claim 1, wherein the indicator is engaged directly by the water flowing into the guide.

3. The ice fishing jig of claim 1, wherein the indicator is floatable in water.

4. The ice fishing jig of claim 1, wherein the body includes a reel for receiving fish line.

5. The ice fishing jig of claim 1, wherein the biasing member includes a bolt having a head, wherein the bolt is disposed through the body and the guide and a spring is disposed between the head and the guide.

6. An ice fishing jig to be used in conjunction with a hole cut into a frozen surface of a body of water to expose liquid water within the hole, comprising:
    a floatable indicator;
    a body rotatably attached to a biasing member at the second end of the guide to occlude and seal at least one guide aperture in the second end;
    a fish line attached to the body to rotate the body about the biasing member and relative to the guide upon movement of the fish line, rotational movement of the body unsealing the at least one guide aperture to allow water flow into the guide to engage and float the indicator causing the indicator to rise in the guide and protrude from the first end of the guide.

7. The ice fishing jig of claim 6 further comprising a support assembly engaged with the guide to hold the guide in a partially submerged position in the hole.

8. The ice fishing jig of claim 7, wherein the support assembly is pivotally attached to the guide.

9. The ice fishing jig of claim 8, wherein the support assembly having a handle end, a restraining end and a support rod distally positioning therebetween.

10. The ice fishing jig of claim 9, wherein the support rod is movable between a carry position and a support position.

11. The ice fishing jig of claim 9, wherein the restraining end is shaped complementarily to and engages the guide in the carry position.

12. The ice fishing jig of claim 7, wherein the guide has a recess to receive the support assembly in the support position.

13. An ice fishing jig to be used in conjunction with a hole cut into a frozen surface of a body of water to expose liquid water within the hole, comprising:
    a guide sized to fit in the hole having a first open end, a second closed end having a plurality of guide apertures extending therethrough, the guide apertures equidistantly spaced apart on the second closed end, a support assembly associated with the guide for supporting the second closed end positioned below the water and the first open end above the water;
    a indicator sized to fit within the guide;
    a body rotatably attached beneath the guide at the second closed end to occlude the plurality of guide apertures, the body having at least one body aperture therethrough alignable with the plurality of guide apertures in the second closed end when the body is rotated to a predetermined position; and a fish line attached to the body to rotate the body relative to the guide, movement of the body aligning the plurality of guide apertures with the at least one body aperture to allow water to flow there through into the guide to float the indicator causing the indicator to rise in the guide and protrude from the first open end of the guide.

14. The ice fishing jig of claim 13, wherein the guide consists of a tube with a hollow interior.

15. The ice fishing jig of claim 13, wherein the indicator consists of a light resilient foam of polystyrene.

16. The ice fishing jig of claim 13, further comprising line guide attached to the guide to direct the fish line off the body.

17. The ice fishing jig of claim 13, further comprising a biasing member attached through the body and the guide.

18. The ice fishing jig of claim 13, wherein the support assembly is pivotally attached to the guide.

19. The ice fishing jig of claim 18, wherein the support assembly has a handle end, a restraining end and a support rod distally positioning therebetween.

20. The ice fishing jig of claim 19, wherein the support rod is movable between a carry position and a support position.

* * * * *